United States Patent
Roberts et al.

[15] 3,645,298
[45] Feb. 29, 1972

[54] COLLIMATED HOLE FLOW CONTROL DEVICE

[72] Inventors: John A. Roberts, North Chelmsford; Norman F. Surprenant, Littleton, both of Mass.

[73] Assignee: Brunswick Corporation

[22] Filed: Jan. 30, 1968

[21] Appl. No.: 701,779

[52] U.S. Cl. .................................................. 138/40
[51] Int. Cl. .................................................. F15d 1/02
[58] Field of Search ............... 29/423; 138/26, 37, 40, 42–44

[56] References Cited

UNITED STATES PATENTS

| 3,506,885 | 4/1970 | Roberts et al. | 317/230 |
| 1,078,834 | 11/1913 | Cook | 138/42 X |
| 1,644,157 | 10/1927 | Smith | 29/423 UX |
| 2,075,316 | 3/1937 | Tyden | 181/36.2 UX |
| 2,499,977 | 3/1950 | Scott | 29/423 UX |
| 2,619,438 | 11/1952 | Varian et al. | 29/423 X |
| 2,628,417 | 2/1953 | Peyches | 29/423 UX |
| 2,674,032 | 4/1954 | Martin et al. | 138/40 X |
| 2,803,116 | 8/1957 | Tilney | 138/40 X |
| 2,825,203 | 3/1958 | Bertin et al. | 138/44 X |
| 3,105,570 | 10/1963 | Bezemes | 138/42 X |
| 3,451,404 | 6/1969 | Self | 138/46 X |

FOREIGN PATENTS OR APPLICATIONS

| 813,094 | 9/1951 | Germany | 138/40 |

*Primary Examiner*—Edward J. Earls
*Attorney*—Hofgren, Wegner, Allen, Stellman & McCord

[57] ABSTRACT

A flow control device formed of one or more collimated hole structures having a plurality of passages of preselected small cross-sectional area and having accurate configuration and arrangement. A plurality of such devices may be formed by cutting from a longer preform whereby the passages have accurate correspondence at the interface defined by the cut permitting the two elements to provide an accurate valving action as a function of lateral displacement therebetween. The collimated hole structure has in one form a preselected aspect ratio of the length to cross-sectional area to provide a preselected pressure drop for accurate control of fluid flow therethrough. The configuration of the passages may comprise a highly accurately rectilinear parallel configuration, as well as turned configurations and nonparallel configurations. Further, a portion of the device may be constricted to provide a corresponding constriction of the flow passage.

9 Claims, 23 Drawing Figures

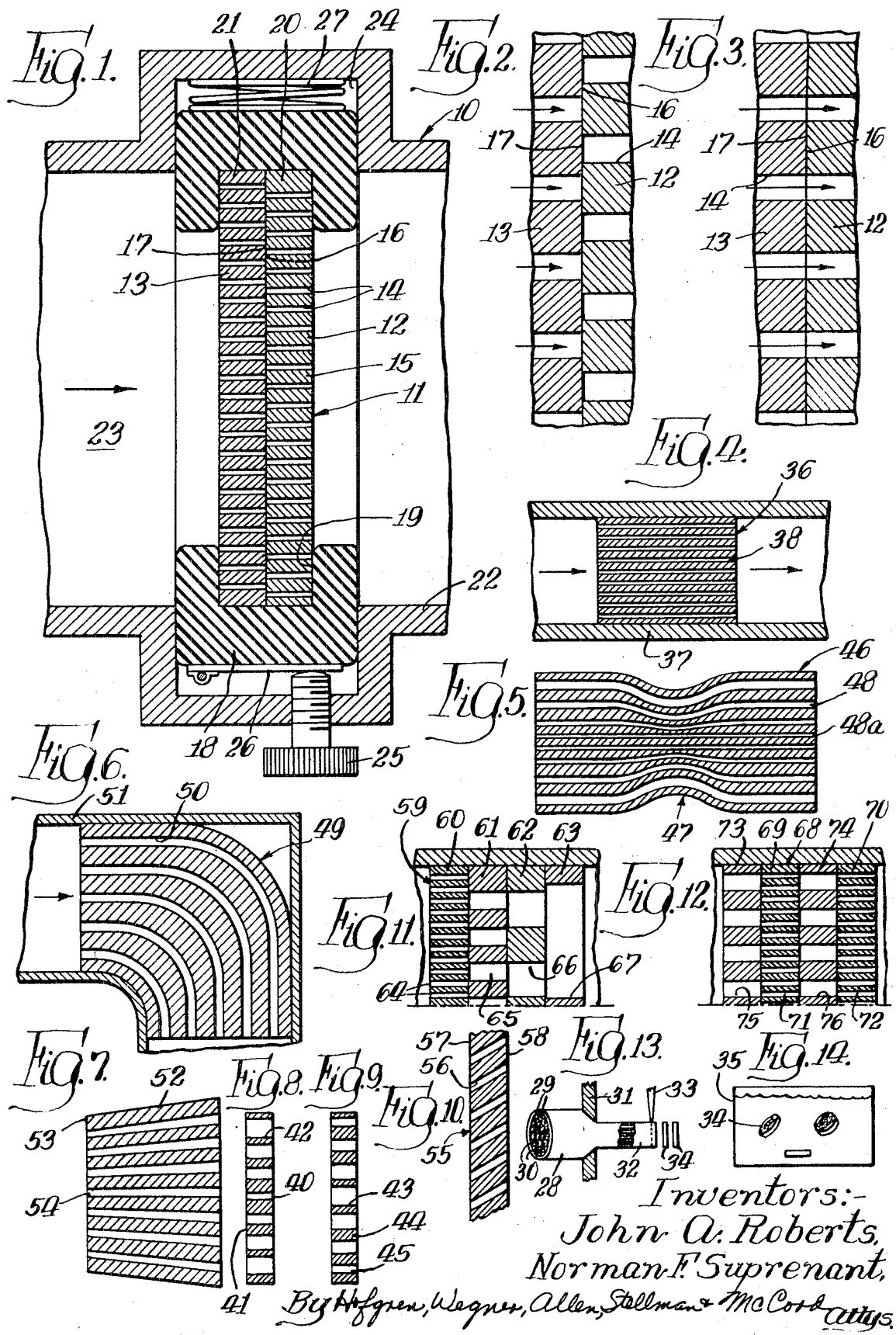

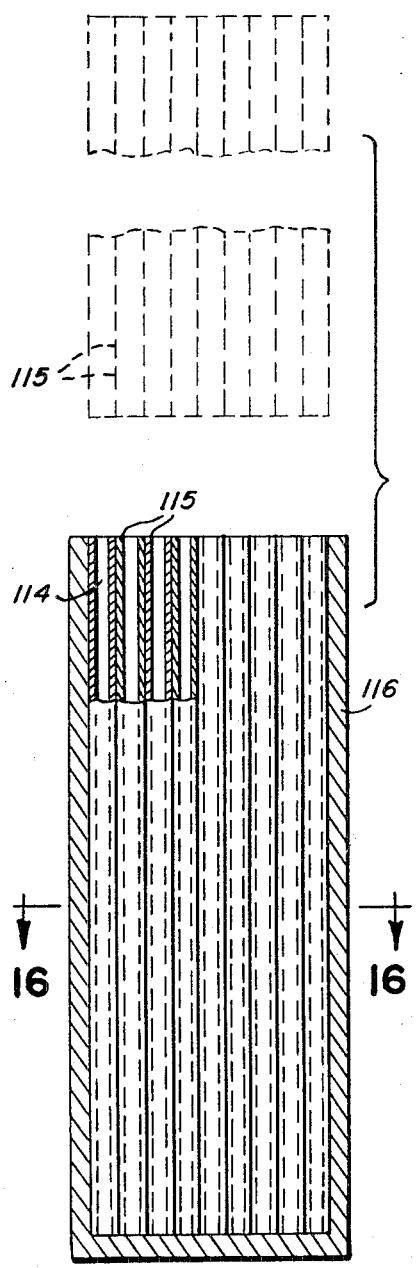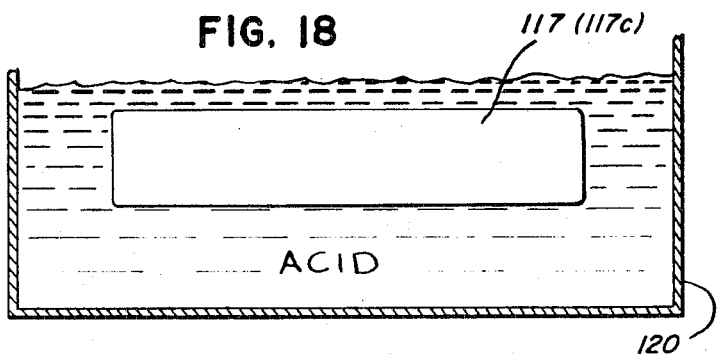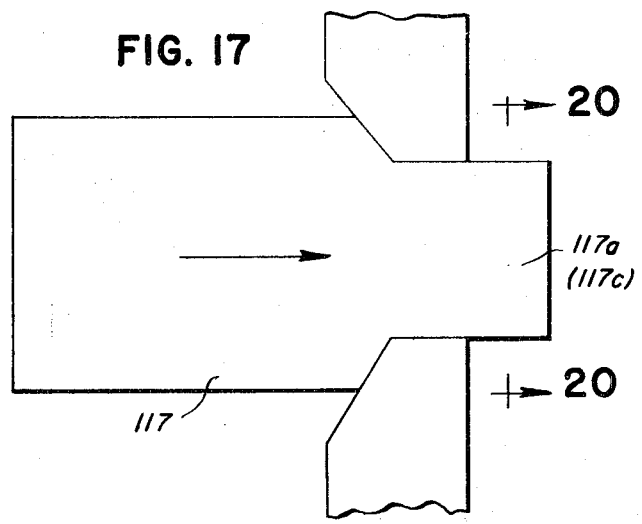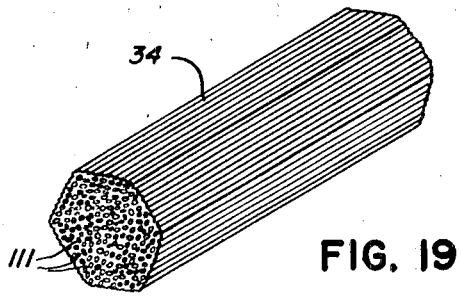

COLLIMATED HOLE FLOW CONTROL DEVICE

This invention relates to flow control devices and, in particular, to collimated hole structure flow control devices.

In copending Roberts and Roberts application for U.S. Letters Patent, Ser. No. 471,123, filed July 12, 1965, now abandoned in favor of continuation-in-part application Ser. No. 778,679, filed Nov. 25, 1968, now U.S. Pat. No. 3,506,885, and both owned by the assignee hereof, an improved passage structure is shown and claimed to comprise a member having highly accurately controlled through passages of very small size. As brought out in detail in said application, the collimated hole structure member is formed by constricting a bundle of tubular elements having a suitable core material disposed coaxially therein which may be subsequently removed while leaching the core material. The constriction process is carried on to a point where the tubular elements are coalesced into a unified, substantially homogeneous body. Thus, when the core material is removed, the body defines a plurality of spaced through passages, the configuration and arrangement of which may be highly accurately controlled in the constriction process.

It has been found that the above-described passage structure may be adapted for improved flow control applications such as fluid flow and radiant energy flow control. More specifically, the collimated hole passage structure of the present invention provides a substantial improvement over the known forms of flow control device utilizing pairs of orificed plates for valving functions as a result of the improved high accuracy in the configuration and arrangement of the passages. Still further the collimated hole passage structure of the present invention provides a substantial improvement in the use thereof as a flow restrictor or pressure drop device as a result of the high accuracy in the passage configuration and arrangement with high porosity for permitting increased flow volume. Further, as a result of the high accuracy and small size of the individual passages, the collimated passage structure of the present invention permits a fast valving action with extremely small movement of the valve elements so that the device is adapted for use as a fluid amplifier as well as a fast-acting valve.

Another advantage of the collimated hole passage structure of the present invention is the adaptability thereof as a surge control device and as a means for making turbulent fluid flow laminar for improved low-loss conduction of the fluid through a passage structure. As the collimated hole passage structure may be subsequently formed as a result of the strong unified construction thereof, the structure is adapted for a large number of flow control applications wherein the passages may be turned, partially constricted, tapered, etc.

Thus, a principal feature of the present invention is the provision of a new and improved flow control device.

Another feature of the invention is the provision of such a flow control device including body means provided with a plurality of through passages having a maximum cross section dimension of under approximately 500 microns and being transversely cut to define a pair of relatively movable portions defining a pair of confronting juxtaposed faces whereby the arrangement of passage openings in one of the faces corresponds accurately to the arrangement of the passage openings in the other of the faces, and means selectively disposing the portions with the passage openings of the respective portions accurately aligned or adjustably disaligned for controlling flow of a medium therethrough.

Still another feature of the present invention is the provision of such a flow control device wherein the passages are arranged in a new and improved manner.

Yet another feature of the invention is the provision of such a flow control device wherein the passages occupy at least approximately one-half of the cross-sectional area of the device.

A further feature of the invention is the provision of such a flow control device wherein the device is arranged selectively in full flow or flow-blocking arrangements by a transverse translation of one portion relative to the other of less than approximately 5 mils.

A yet further feature of the invention is the provision of such a flow control device adapted to be mounted in a means defining a passage for controlling flow therethrough, the device being defined by a body means provided with a plurality of through flow passages having a transverse cross section dimension of under approximately 500 microns and a length to cross section aspect ratio preselected to provide a preselected fluid flow pressure drop therethrough, the flow passages being formed by constricting a composite including a plurality of elongated elements in spaced, generally parallel relationship in a matrix and removing the elements from the constricted composite to leave a corresponding plurality of through flow passages in the remaining matrix.

A still further feature of the invention is the provision of such a flow control device wherein the composite is drawn to provide the desired constriction.

Another feature of the invention is the provision of such a flow control device wherein the flow passages are arranged in a diverging array.

Still another feature of the invention is the provision of such a flow control device wherein the flow passages are turned.

A further feature of the invention is the provision of such a flow control device wherein the passages are provided with reduced cross section at one portion thereof.

A yet further feature of the invention is the provision of such a flow control device wherein the passages are provided with reduced cross section at a midportion thereof.

A still further feature of the invention is the provision of such a flow control device wherein the passages narrow toward one end of the member.

Another feature of the invention is the provision of such a flow control device wherein the member includes an end face and the flow passages open obliquely thereinto.

Still another feature of the invention is the provision of such a flow control device wherein the member is constricted at a midportion thereof.

Yet another feature of the invention is the provision of such a flow control device adapted to be mounted in a means defining a passage, the device being defined by a first member provided with a plurality of first through flow passages having a transverse cross section dimension of under approximately 500 microns and a length to cross section aspect ratio preselected to provide a first preselected fluid flow pressure drop therethrough, and a second member provided with a plurality of second through flow passages having a different transverse cross section dimension of under approximately 500 microns and a length to cross section aspect ratio preselected to provide a second, substantially different preselected fluid flow pressure drop therethrough, the members having juxtaposed confronting end faces with the first passages opening to the second passages at the end faces, the flow passages being formed by constricting a composite including a plurality of elongated elements in spaced, generally parallel relationship in a matrix and removing the element in the constricted composite to leave a corresponding plurality of through flow passages in the remaining matrix.

A further feature of the invention is the provision of such a flow control device wherein the cross-sectional area of the first passages differs from the cross-sectional area of the second passages.

A still further feature of the invention is the provision of such a flow control device further including a third member provided with a plurality of third through passages having a transverse cross section dimension of under approximately 500 microns and a length to cross section aspect ratio preselected to provide a preselected fluid flow pressure drop therethrough, the members having juxtaposed confronting end faces with the first passages opening to the second passages at the end faces between the first and second members and said second passages opening to the third passages at the end faces between the second and third members.

Other features and advantages of the invention will be apparent from the following description taken in connection with the accompanying drawing wherein:

FIG. 1 is a fragmentary diametric section of a fluid control valve device embodying the invention;

FIG. 2 is a fragmentary enlarged diametric section illustrating a partial flow blocking arrangement thereof;

FIG. 3 is a fragmentary enlarged diametric section illustrating a full flow arrangement thereof;

FIG. 4 is a diametric section of a flow control device embodying the invention providing preselected fluid pressure drop;

FIG. 5 is a diametric section of a flow control device similar to that of FIG. 4, but wherein the midportion is constricted to provide constricted passages therein;

FIG. 6 is a diametric section of such a flow control device wherein the passages are turned 90°;

FIG. 7 is a diametric section of such a flow control device wherein the passages diverge toward one end of the device;

FIG. 8 is a diametric section of such a flow control device wherein the passages vary in cross-sectional area in direct relationship to the spacing thereof from the axis;

FIG. 9 is a diametric section of such a flow control device wherein the passages vary in cross-sectional area in inverse relationship to the spacing thereof from the axis;

FIG. 10 is a diametric section of such a flow control device wherein the passages are skewed to the opposite faces thereof;

FIG. 11 is a fragmentary diametric section of such a flow control device made up of a plurality of collimated hole structures;

FIG. 12 is a fragmentary diametric section illustrating another form of flow control device formed of a plurality of collimated hole structures;

FIG. 13 is a schematic elevation illustrating the formation of a constricted billet from which the flow control devices are formed; and FIG. 14 is a schematic view of a leaching tank in which the composite is leached to define the collimated hole structure.

Figure 16:
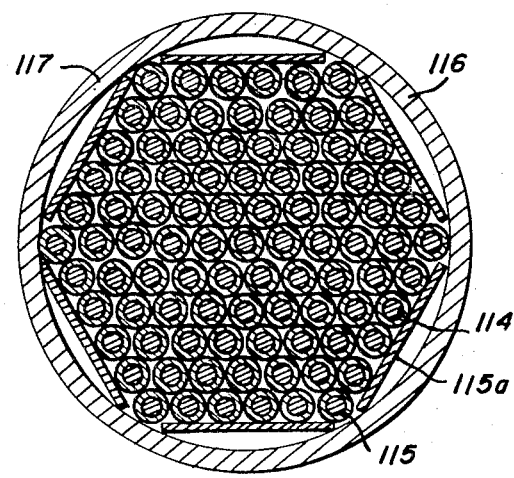
Figure 20:
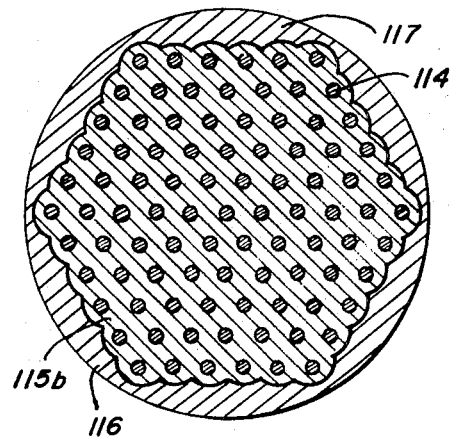
Figure 22:
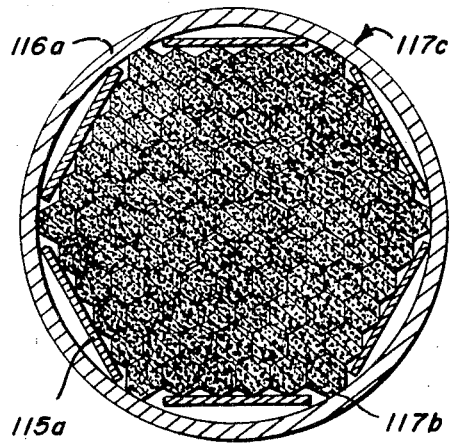
Figure 21:
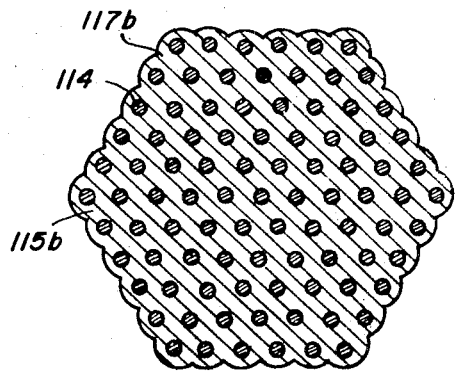
Figure 23:
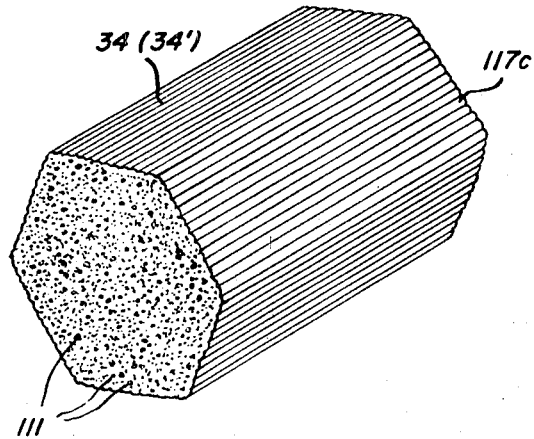

In the exemplary embodiment of the invention as disclosed in FIGS. 1 through 3 of the drawing, a flow control valve device generally designated 10 embodying the invention is shown to comprise a body means generally designated 11 including a pair of relatively movable portions 12 and 13. Each portion effectively comprises a cylindrical collimated hole structure having a plurality of accurately formed flow passages distributed in a matrix body 15. The passages preferably have a maximum transverse cross section of under approximately 500 microns and herein have a cross section of under approximately 25 microns. The portions 13 and 14 may be cut from a larger body to define a pair of confronting faces 16 and 17 wherein the passage openings correspond accurately. The passage openings may comprise approximately one-half of the area of the respective faces 16 and 17. Illustratively, the passages may be arranged to have a diameter of approximately 0.005 inches and a spacing therebetween of approximately 0.005 inches in a collimated hole structure having an approximate one-half inch outer diameter whereby the valve portions may be moved from a full flow position, such as shown in FIG. 3, to a full blocking position, such as shown in FIG. 2, by a transverse translation of one portion relative to the other of approximately 5 mils.

As shown in FIG. 1, the flow control device 10 further includes an annular support 18 extending circumjacent the movable portions 12 and 13 and having a radially inwardly opening recess 19 in which the peripheral portions 20 and 21 are received. The device is mounted in a suitable tubular duct 22 defining a flow passage 23. The support ring 18 is received in an annular recess 24, as shown in FIG. 1.

Relative movement between the valve portions 12 and 13 may be effected by a thumbscrew 25 extending through the duct wall to bear against a pressure plate 26 radially outwardly of the valve portion 12. The opposite portion of the support 18 may be backed up by a suitable spring 27. The support ring may be formed of a resilient material such as rubber and, thus, pressure developed by thumbscrew 25 may be transmitted through the support ring 18 to effect movement of valve portion 12 relative to valve portion 13 and thereby selectively dispose the valve portions for the desired flow control. As discussed above, only a small amount of relative movement need be effected to provide the full range of control.

As shown in FIGS. 13 and 14, the valve portions 12 and 13 may be formed by a constriction method such as disclosed and claimed in the copending application of Roberts and Roberts, Ser. No. 471,123, filed July 12, 1965, for a "Passage Structure," now abandoned in favor of continuation-in-part application Ser. No. 778,679, filed Nov. 25, 1968, and both owned by the assignee hereof. More specifically, the valve members may be formed by suitably constricting a bundle 28 of rods 29 in sheaths 30 formed of a material permitting subsequent separation of the rods therefrom. Illustratively, the rods may be formed of monel metal and the sheaths may comprise tubular stainless steel sheaths. The bundle of rods 28 may be constricted by any suitable means such as by being drawn through a suitable die 31 with sufficient reduction steps being provided to reduce the bundle of rods to a constricted billet 32 wherein the monel rods define extremely fine filamentary elements having a cross-sectional diameter of under approximately 500 microns. It has been found that such a process may be used to provide such a billet wherein the filaments are extremely small such as down to 1 micron or less.

The billet may be cut by suitable means such as knife 33 into discrete portions 34 which may be subsequently treated to remove the monel filaments such as by leaching the portions 34 in a suitable acid bath 35. The portions 34 may be similar in thickness to the valve portions 12 and 13 whereby the leached elements may individually define the valve portions. Alternatively, longer sections of the billet may be cut and leached to be subsequently cut to the valve portion thickness whereby the confronting faces of the cut portions may define faces 16 and 17. Thus, the valve portions may have the passages resulting from the leaching of the filaments therefrom highly accurately formed and arranged and in highly accurate aligned relationship with the passages of the cooperating valve portion. The faces 16 and 17 may be polished to provide improved sliding facial engagement therebetween in the valve device 10.

In the illustrated embodiment, the passages 14 in the valve portions 12 and 13 are substantially rectilinear and extend parallel to each other through the respective valve portions. The passages are uniformly distributed throughout the valve portions. The invention, however, comprehends the provision of such valve portions utilizing nonrectilinear, nonparallel, or nonuniformly distributed passages as desired.

By virtue of the relatively small transverse displacement required to selectively disposed the valve in the full open and full closed positions, the valve may be utilized as a fluid amplifier having relatively high efficiency while yet permitting high fluid flow therethrough in the full open position. Thus, in such applications, the thumbscrew 25 may be substituted for by a suitable automatic transducer as desired.

Referring now to the embodiments of FIGS. 4 through 10, the invention further comprehends the use of the collimated hole structure as a flow control device in regulating the flow of a fluid therethrough as a function of the aspect ratio of the passages. Thus, by utilizing passages having a preselected length to cross-sectional ratio a preselected pressure drop may be obtained across the collimated hole structure while a high porosity may be maintained such as up to approximately 80 percent. Thus, as shown in FIG. 4, the collimated hole structure 36 is provided in a tubular flow duct 37 to have the passages 38 extend parallel to the axis of the duct 37. By preselecting the collimated hole structure to have a desired aspect ratio, a preselected pressure drop may be maintained across the collimated hole structure. By utilizing extremely small passages such as passages having transverse cross sections of under 25 microns, an improved pressure drop restrictor is provided.

Thus, the collimated hole structure 36 may comprise a highly efficient surge control. Further, the structure 36 smooths out turbulent flow of the fluid through the duct to make the flow more highly streamlike.

The passages 36 may be distributed uniformly across the cylindrical collimated hole structure 36. In certain fluid flow applications, however, it may be desirable to provide a modified distribution of the passages such as illustrated in FIGS. 8 and 9. Thus, in FIG. 8, the axial passage 40 of the collimated hole structure 41 has a relatively small diameter and the passages increase in diameter to the outermost passages 42 which have the maximum diameter. Reversely, as shown in FIG. 9, the axial passage 43 of the illustrated collimated hole structure 44 has the maximum diameter and the outermost passages 45 have the minimum diameter. Other nonuniform distributions may be provided as desired by suitably providing correspondingly larger and smaller diameter rods in the original bundle 28.

A modified form of collimated hole structure generally designated 46 is shown in FIG. 5 to comprise a structure generally similar to collimated hole structure 36, but having the midportion 47 thereof constricted to resultingly constrict the flow passages 48 and thus provide a facilitated means for accurately calibrating the device for a desired pressure drop.

The improved flow restriction control of collimated hole structure 46 is further provided by the elongation of the flow passages 48 as a result of the constricted center portion 47. As shown in FIG. 5, the constriction not only reduces the cross-sectional area, but further elongated the passages other than the axial passage 48a as a result of the displacement of the passages radially inwardly.

In FIG. 6, another modified form of collimated hole structure generally designated 49 is shown to comprise a turned structure wherein passages 50 turn 90°. Such a collimated hole structure may, for example, be utilized to advantage at a corner of a flow duct such as flow 51 as the structure tends to maintain the flow in nonturbulent smooth paths.

A form of collimated hole structure 52 which may be utilized as a flow restrictor is shown in FIG. 7 wherein the collimated hole structure is compressed to taper toward one end 53 and thus reduce the cross section of the flow passages 54 therethrough toward that end. By virtue of the large number of passages, an improved flow restrictor action may be obtained as, in effect a corresponding large number of individual flow restrictors are provided.

As indicated briefly above, the collimated hole structure may be provided with flow passages which are skewed to the end surfaces thereof. Thus, in FIG. 10, a collimated hole structure generally designated 55 is shown to include a plurality of passages 56 opening angularly through the opposite surfaces 57 and 58 thereof. Such skewed passage structures may be utilized in many applications where a change in the direction of the fluid flow as well as a control of the flow rate and pressure is desired.

It has been found that a composite collimated hole structure, such as composite 59 as shown in FIG. 11, may provide further improved fluid flow control. Illustratively, structure 59 may comprise a plurality of collimated hole structures, such as structures 60, 61, 62 and 63, which progressively have larger diameter passages, such as passages 64, 65, 66 and 67. Illustratively, the larger passages may have a sufficient cross-sectional area to communicate with a plurality of the next smaller passages whereby a progressively changing passage size is presented to the fluid flow which may be either increasing where the fluid flow is from left to right as seen in FIG. 11, or decreasing where the fluid flow is from right to left as seen therein.

A further alternative collimated hole structure generally designated 68 is shown in FIG. 12 wherein collimated hole structures 69 and 70 are provided with relatively small flow passages 71 and 72, and collimated hole structures 73 and 74 are provided with larger flow passages 75 and 76. The large and small flow passage structures are alternated to provide a series of flow passage cross section changes.

The use of a plurality of such collimated hole structures in series permits accurate control of the fluid flow by permitting selection of different passage sizes in the different structure for a cumulative control as desired. As the collimated hole structures may be highly accurately formed by controlled reduction of the bundle 28 to the final desired billet 32, a high degree of accuracy is obtained in the flow control parameters. As the structures may be accurately cut to any desired length, the structures again may be readily calibrated by suitably adjusting the lengths thereof. The arrangement and size of the passages may be readily made to suit by suitably arranging selected size rods 29 in the original bundle 28. As the body material defined by the sheaths 30 may be any suitable material which may be constricted to form the composite 32, a wide range of material characteristics is available. The use of stainless steel for this purpose has been found to offer many advantages in many fluid flow applications as it offers long life with maintained accuracy of the fluid flow control.

The fluid flow control devices of the present invention are extremely economical of construction, while yet providing the many advantages discussed above. While we have shown and described certain embodiments of our invention, it is to be understood that it is capable of many modifications. Changes, therefore, in the construction and arrangement may be made without departing from the spirit and scope of the invention as defined in the appended claims.

We claim:

1. A flow control device for controlling the flow of fluid comprising:
   a conduit having interior walls defining a passage capable of having a flow of fluid therethrough; and
   a unitary body located and adjacent the interior walls, the body having a plurality of passage means therein and being oriented to permit fluid flow therethrough, the passage means having an effective cross section dimension of approximately less than 500 microns to simultaneously provide preselected fluid flow rates therethrough and convert turbulent flow entering the body to laminar flow exiting the body, and where the passage means have a preselected aspect ratio to provide for a preselected fluid flow pressure drop thereacross.

2. The flow control device of claim 1 wherein at least one of the passage means has a maximum transverse cross section dimension of under approximately 25 microns.

3. The flow control device of claim 1 wherein passage means in the body have different preselected cross-sectional dimensions.

4. The flow control device of claim 1 wherein each of the passage means has substantially parallel sides.

5. The flow control device of claim 4 wherein the passage means have a preselected curvature with respect to the longitudinal axis of the body.

6. The flow control device of claim 4 wherein the passage means are arranged in a converging array.

7. The flow control device of claim 1 wherein at least a portion of the passage means toward one end of the body.

8. The flow control device of claim 1 wherein said body has two planar end faces and wherein the passage means open at a preselected orientation to one face of said body.

9. The flow control device of claim 1 wherein there are a plurality of unitary bodies adjacent to each other.

* * * * *